United States Patent
Watanabe et al.

(10) Patent No.: US 6,826,450 B2
(45) Date of Patent: Nov. 30, 2004

(54) ROBOT CONTROLLER

(75) Inventors: Atsushi Watanabe, Tokyo (JP); Tetsuaki Kato, Hadano (JP); Yukinobu Tsuchida, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/122,218

(22) Filed: Apr. 16, 2002

(65) Prior Publication Data

US 2002/0173878 A1 Nov. 21, 2002

(30) Foreign Application Priority Data

Apr. 16, 2001 (JP) ........................................ 2001/116693

(51) Int. Cl.[7] .............................................. G06F 19/00
(52) U.S. Cl. ........................ 700/245; 700/182; 700/247; 318/568.11; 318/568.12; 318/568.13; 318/568.19; 901/30; 901/41; 901/42; 901/49; 219/124.34
(58) Field of Search ................................. 700/182, 245, 700/247; 318/563, 564, 568.11, 568.12, 568.13, 568.19, 625, 632; 901/30, 41, 42, 49; 219/124.34, 125.1; 483/16, 31, 58

(56) References Cited

U.S. PATENT DOCUMENTS

| | | | | |
|---|---|---|---|---|
| 5,619,111 A | * | 4/1997 | Katagiri et al. | 318/625 |
| 5,668,930 A | * | 9/1997 | Hamura et al. | 700/252 |
| 5,742,143 A | * | 4/1998 | Katagiri | 318/625 |
| 6,021,361 A | * | 2/2000 | Taninaga et al. | 700/182 |
| 6,023,044 A | * | 2/2000 | Kosaka et al. | 219/124.34 |
| 6,035,242 A | * | 3/2000 | Uemura et al. | 700/97 |
| 6,124,693 A | * | 9/2000 | Okanda et al. | 318/568.11 |

FOREIGN PATENT DOCUMENTS

| | | | |
|---|---|---|---|
| JP | 62-242201 | | 10/1987 |
| JP | 6-43918 | | 2/1994 |
| JP | 1998-203527 | * | 2/1998 |
| JP | 11-77572 | | 3/1999 |

* cited by examiner

*Primary Examiner*—Thomas G. Black
*Assistant Examiner*—McDieunel Marc
(74) *Attorney, Agent, or Firm*—Staas & Halsey LLP

(57) ABSTRACT

Bendings $\Delta\alpha$, $\Delta\beta$, and $\Delta\theta$ are determined by the torques about the axes of coordinate systems disposed to respective joints and by spring constants. Parameters $\alpha$, $\beta$, and $\theta 0$ are determined by adding an amount of twist to corrected D-H parameters $\alpha s$, $\beta s$, and $\theta 0s$ when twist is "0". A rotational angle $\theta'$ ($\theta st$) is determined from a target position x by executing inverse kinematics using the parameters $\alpha s$, $\beta s$, and $\theta 0s$ (step S6). Further, a position x' is determined from the rotational angle $\theta'$ by executing forward kinematics using the parameters $\alpha$, $\beta$, and $\theta 0$, and the difference $\Delta x$ between the target position x and the position x' is determined. The difference is corrected, and a new target position x is set. Thereafter, the inverse kinematics and the forward kinematics are alternately repeated, and a rotational angle $\theta$ when the difference $\Delta x$ is equal to or less than a predetermined value is set as a rotational angle $\theta$ after correction has been executed, thereby a commanded rotational angle j in which bending has been corrected is determined.

20 Claims, 4 Drawing Sheets

ROBOT CONTROLLER

BACKGROUND OF THE INVENTION

1. Field of the Invention

The present invention relates to an articulated robot controller. In particular, the present invention relates to a robot controller capable of obtaining a position/attitude with high accuracy in consideration of the bendings of a robot mechanical section.

2. Description of the Prior Art

As it is strongly required to reduce the weight of robots and to increase the operating speed thereof, the mechanical sections of the robots are easy to bend more, and the influence of the bent mechanical sections on accuracy becomes unignorable. To cope with this problem, in conventional robots, a high accuracy locus control has been actively controlled by compensating the bendings of a 2-mass model caused by the low rigidity of a reducer of each axis. As to robot arms themselves, a dimensionless flexible arm (in which a secondary mode, a ternary mode, . . . , of a resonance frequency exist) of one axis is arranged as a model using Beam Equation so that the arm is controlled by being made to have a low dimension. Further, Japanese Patent No. 3120028, and the like propose a method of controlling the elastic deformation of an arm (link) by simply decomposing it into components in a motor rotational direction.

Articulated robots have a problem in that they are vibrated because the motion thereof is amplified on the influence of axes, which is not a problem in one-axis control. Controlling a flexible arm has a drawback in that it requires a long calculation processing time. A problem of multi-axis control has not been taken into consideration until today. Further, the method disclosed in Japanese Patent No. 3120028 described above cannot execute control perfectly because it only takes the elastic deformation of the arm (link) into consideration very simply.

OBJECTS AND SUMMARY OF THE INVENTION

An object of the present invention is to provide a robot controller capable of operating an articulated flexible arm robot at a high speed with a high accuracy by correcting bendings produced in the robot.

To achieve the above object, a robot controller according to the present invention for driving the respective links of a robot by respective actuators comprises a bending calculation means for determining the bendings produced in the respective joints at the target position/attitude of a robot hand distal end based on a teaching program, or determining the bending produced in the respective joints and respective links; a robot hand distal end offset calculation means for determining the offset from the target position and/or the offset from the target attitude of the distal end based on the thus determined bendings; and corrected position calculation means for determining the positions of the actuators for driving the robot hand distal end to a position and/or an attitude to which a correction having the same magnitudes as those of the offset is applied in an inverse direction.

According to the robot controller having the above structure, it is possible to position the robot to a target position/attitude by correcting the bendings of the entire robot.

Further, a robot controller for a robot whose respective links are driven by respective actuators and which executes a job by pressing a robot hand distal end against an object includes a sensor for detecting a reaction force produced when the robot hand distal end is pressed against the object; bending calculation means for determining the bendings produced in the respective joints at the target position/attitude of the robot hand distal end based on a teaching program; a robot hand distal end offset calculation means for determining the offset from the target position and/or the offset from the target attitude of the distal end based on the thus determined bendings; and a corrected position calculation means for determining the positions of the actuators for driving the robot hand distal end to a position and/or an attitude to which a correction having the same magnitudes as those of the offset is applied in an inverse direction.

According to the robot controller having the above structure, it is possible to maintain the position/attitude of the robot to a target value by correcting the bendings produced when the robot hand distal end is pressed against the object.

BRIEF DESCRIPTION OF THE DRAWINGS

The above and other objects and features of the present invention will be apparent from the description of the following embodiment taken in conjunction with the accompanying drawings, wherein.

DETAILED DESCRIPTION OF THE PREFERRED EMBODIMENTS

First, the principle and method of an embodiment of the present invention will be described with reference to a robot controller for controlling a six-axis vertical articulated robot as an example. This principle and method are also similarly applicable to other types of robots. Further, corrected D-H parameters, for example, will be used as physical parameters of the robot. Other parameters will be also used similarly.

The position/attitude x of a robot hand distal end on a world coordinate system is expressed by the following formula.

$$x = A1 A2 \ldots A6 \, xt$$

Figure 1:
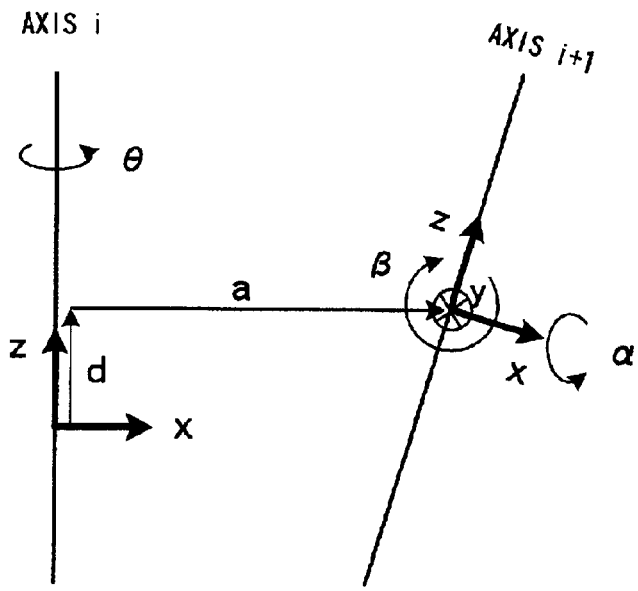
FIG. 1 is an explanatory view of corrected D-H parameters.
Figure 2:
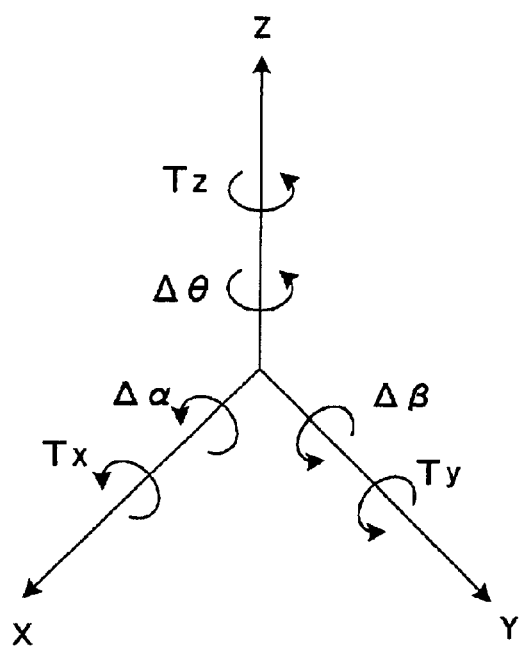
FIG. 2 is an explanatory view of the torques about respective axes in the coordinate system of a joint portion.

In the above formula, xt shows the position of the robot hand distal end on a tool coordinate system, and A0 to A6 are 4×4 coordinate transformation matrix. The corrected D-H parameters (d, a, θ, α, β) are known as parameters showing the coordinate transformation. In the corrected D-H parameters, a represents an offset value between axes in an X-axis direction, d represents an offset value between axes in a Z-axis direction, θ represents a rotational angle about a Z-axis, α represents a rotational angle about an X-axis, and β represents a rotational angle about a Y-axis as shown in FIG. 1. Conventionally, attention is directed to only the rotation θ about the Z-axis in consideration of only the spring property of a reducer about an axis as a parameter of rigidity. In the present invention, however, it is contemplated that the rotational angles α and β about the X- and Y-axes also have a spring property, and these rotational angles, that is, twists are regarded as bendings. Further, the coordinate transformation matrix A (A1A2 . . . A6) where the corrected D-H parameters are used is expressed by the following formula (1).

$$A = \begin{bmatrix} C\theta C\beta - S\theta S\alpha S\beta & -S\theta C\alpha & C\theta S\beta + S\theta S\alpha C\beta & aC\theta \\ S\theta C\beta + C\theta S\alpha S\beta & C\theta C\alpha & S\theta S\beta - C\theta S\alpha C\beta & aS\theta \\ -C\alpha S\beta & S\alpha & C\alpha C\beta & d \\ 0 & 0 & 0 & 1 \end{bmatrix} \quad (1)$$

In the above formula (1), $c\theta$ represents $\cos(\theta)$, $S\theta=\sin(\theta)$, and so on.

Thus, in the present invention, first, forces and torques applied to the respective joints are determined from the angles and commanded speeds of the respective axes at the time by ignoring spring property using a Newton-Euler method that is widely known as a calculation method of robot dynamics. The forces and torques can be determined with a relatively small amount of calculation, although the amount increases in proportion to an increase in the number of axes of a robot.

When the torques about the X, Y, and Z-axes of the respective joints are Tx, Ty, and Tz, respectively, and the spring constants about the X-, Y-, and Z-axes are kx, ky, and kz, respectively, the amounts of twist Δα, Δβ, and Δθ about the X-, Y-, and Z-axes are expressed by the following formula.

$\Delta\alpha = Tx/kx$ $\Delta\beta = Ty/ky$ $\Delta\theta = Tz/kz$

It should be noted here that the spring constants kx, ky, and kz are measured previously.

Then, the corrected D-H parameters are calculated from the following formulas.

$\alpha = \alpha s + \Delta\alpha$ $\beta = \beta s + \Delta\beta$ $\theta 0 = \theta 0 s + \Delta\theta$ It should be noted here that, in the above formula, θ0 shows a rotational angle θ in the corrected D-H parameter in a case where an axial angle is "0" on a teaching pendant (in a command). Then, when it is assumed that the axial angle is j on the teaching pendant, the rotational angle θ in the corrected D-H parameter is shown as "θ=θ0+j". Further, αs, βs, and θ0s are the corrected D-H parameters α, β, and θ where no twist is produced, and these corrected D-H parameters are previously determined by a method of calibration, or the like.

The respective axial angles θ are determined from the target position x of the robot hand distal end by executing inverse transformation using the coordinate transformation matrix A shown by the above formula (1) with the corrected D-H parameters α, β, and θ0. The rotational angles θ of the respective axes are determined by alternately executing the inverse transformation and the forward transformation until the difference between the position/attitudes of the robot hand distal end converges at a value equal to or less than a predetermined value. Then, commanded rotational angles j are determined from the rotational angles θ when the difference converges at the value equal to or less than the predetermined value. The rotational angles j permit the robot hand distal end (tool center point) to be moved to a target point in consideration of the twists (bendings) about the X-, Y-, and Z-axes of the joints.

The above description assumes that elasticity exists about the X-, Y- and Z-axes of the respective joints. When, however, if an elasticity exists at a portion other than the above, for example, at a some midpoint of an arm (link), the target point of the robot hand distal end (tool center point) is determined by the above method in consideration of twist (bending) by creating a dummy coordinate system at the portion and by assuming that the number of axes of the robot is increased by the number of dummy axes provided.

Figure 3:
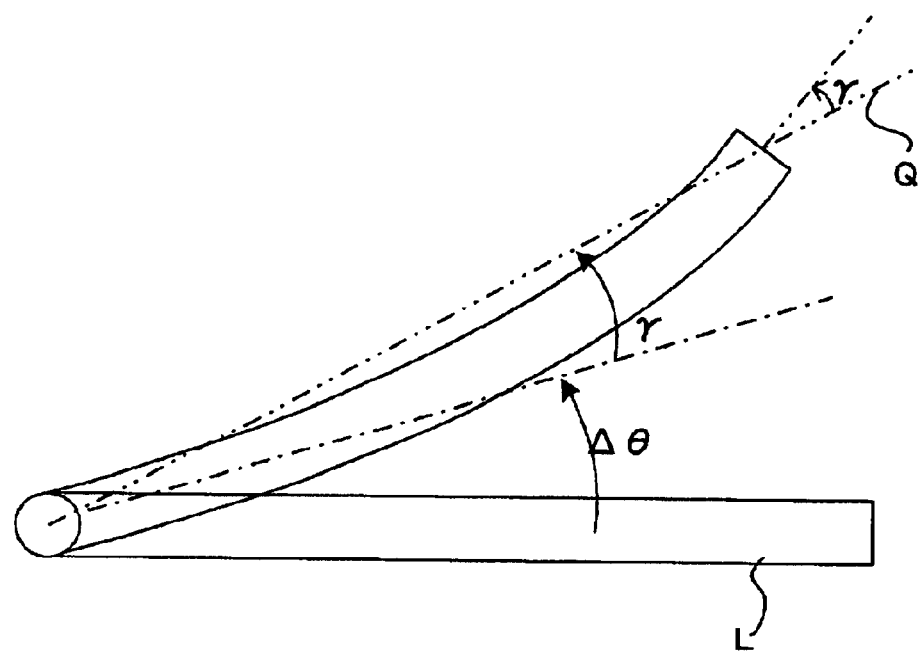
FIG. 3 is an explanatory view of the bending of a link itself.

Further, the above description is made assuming the bending at the link portion as the twist of a joint on a three-dimensional coordinate system. Thus, the influence of the attitude of the robot that is changed by the bending of the link itself is not taken into consideration in the above description. Then the twist of the portion of a reducer (joint) is discriminated from the bending over the entire link, and the bending of the entire link is corrected to cope with the influence on the attitude, assuming that it influences the attitude of the robot. In this case, it is assumed that the link L is bent Δθ at its joint and also the entire link L is bent uniformly, as shown in FIG. 3, with the result that the link L reaches a position where the distal end point thereof rotates γ. Considering the attitude of the distal end of the link L at this time, the attitude of the link L is further rotated γ as compared with a case in which the link L is approximated by a straight line Q. The coordinate transformation matrix A in this case is expressed by the following formula (2).

$$A = \begin{bmatrix} C(\theta + 2\gamma)C\beta - S(\theta + 2\gamma)S\alpha S\beta & -S(\theta + 2\gamma)C\alpha & C(\theta + 2\gamma)S\beta + S(\theta + 2\gamma)S\alpha C\beta & aC(\theta + \gamma) \\ S(\theta + 2\gamma)C\beta + C(\theta + 2\gamma)S\alpha S\beta & C(\theta + 2\gamma)C\alpha & S(\theta + 2\gamma)S\beta - C(\theta + 2\gamma)S\alpha C\beta & aS(\theta + \gamma) \\ -C\alpha S\beta & S\alpha & C\alpha C\beta & d \\ 0 & 0 & 0 & 1 \end{bmatrix} \quad (2)$$

In a case where the bending of an entire link is taken into consideration, the coordinate transformation matrix A expressed by the above formula (2) is used. It should be noted that, in this case, the bending of the entire link is "0" when no bending is produced. That is, γs=0. The correction of the joints due to twist is applied to other respects.

The embodiment of the present invention will be described below.

Figure 4:
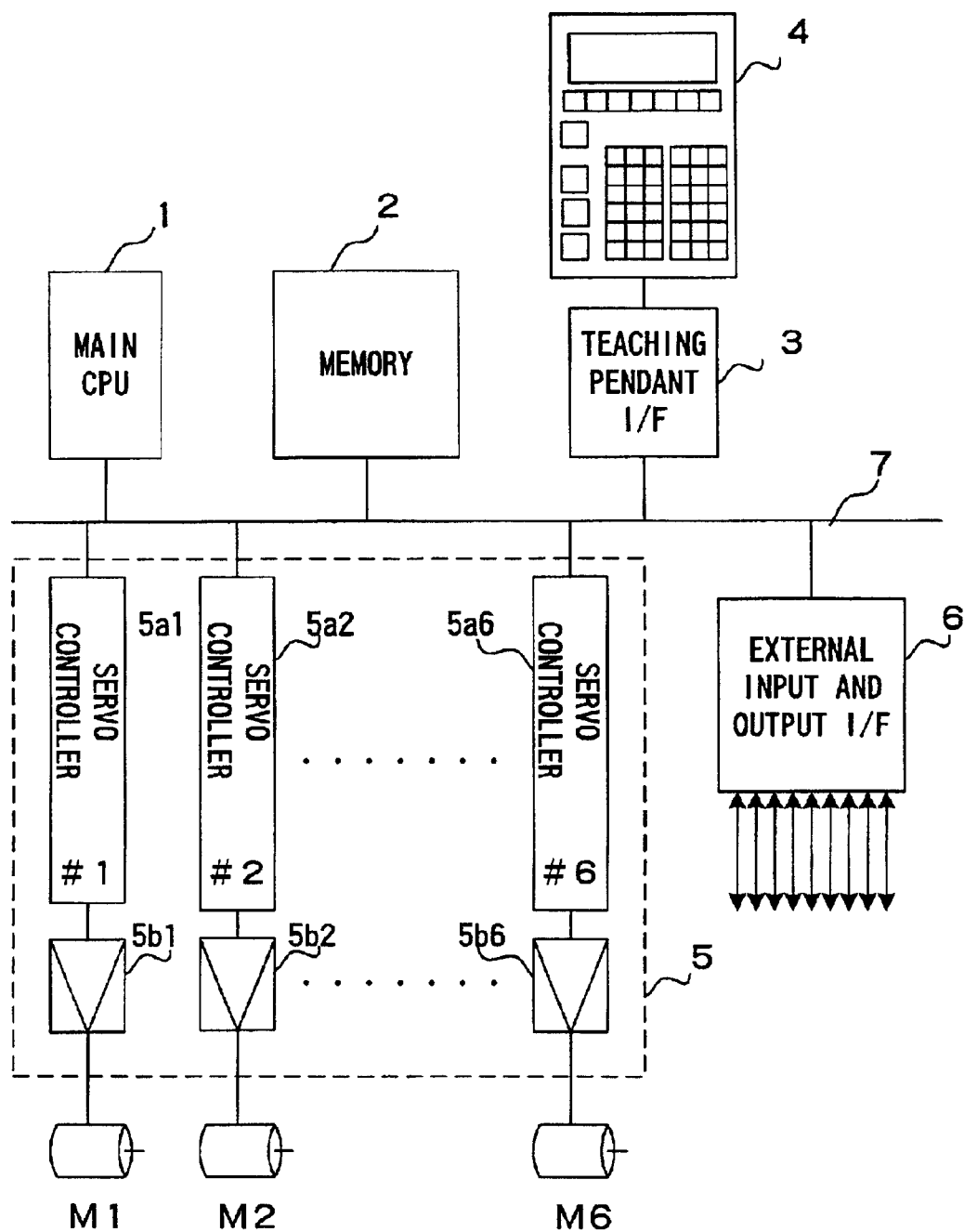
FIG. 4 is an explanatory view of the main portion of a robot controller of an embodiment of the present invention.

FIG. 4 is a block diagram of the main portion of the controller for the six-axis vertical articulated robot of the embodiment of the present invention. This controller is arranged similarly to a controller for a conventional six-axis vertical articulated robot. A main processor 1, a memory 2 composed of a RAM, ROM, non-volatile memory (such as EEPROM), and the like, a teaching pendant interface 3, an external device interface 6, and a servo controller 5 are connected to a bus denoted by a reference numeral 7. Further, a teaching pendant 4 is connected to the teaching pendant interface 3.

A system program for supporting the basic function of the robot and the robot controller is stored in the ROM of the memory 2. Further, the operation programs and relating set data of the robot that is taught according to an application are stored in the non-volatile memory of the memory 2. The RAM of the memory 2 is used as a memory region in which data used in various types of calculation processing executed by the main processor 1 is temporarily stored.

The servo controller 5 includes servo controllers 5a1 to 5a6 each composed of a processor, ROM, RAM, and the like for executing loop controls of the positions and speeds of servo motors for driving the respective axes and further the loop control of a current. The servo controller 5 constitutes a digital servo controller using so-called software to execute loop controls of positions, speeds and current. Servo motors M1 to M6 of the respective axes are driven and controlled by the outputs from the servo controllers 5a1 to 5a6 through respective servo amplifiers 5b1 to 5b6. It should be noted that, while not shown, position/speed detectors are mounted on the respective servo motors M1 to M6, and the positions and speeds of the respective servo motors detected by the position/speed detectors are fed back to the respective servo controllers 5a1 to 5a6. Further, sensors provided with the robot and the actuators and sensors of a peripheral equipment are connected to an input/output interface 6.

The robot controller described above is arranged similarly to that of the conventional robot controller. In the robot controller of this embodiment, it is intended to take the bendings in the joints and links of the robot into consideration and to drive the servo motors M1 to M6 acting as the actuators of the respective axes by correcting the bending components so that the robot hand distal end (tool center point) is accurately driven and controlled according to a target position/attitude.

Figure 5:
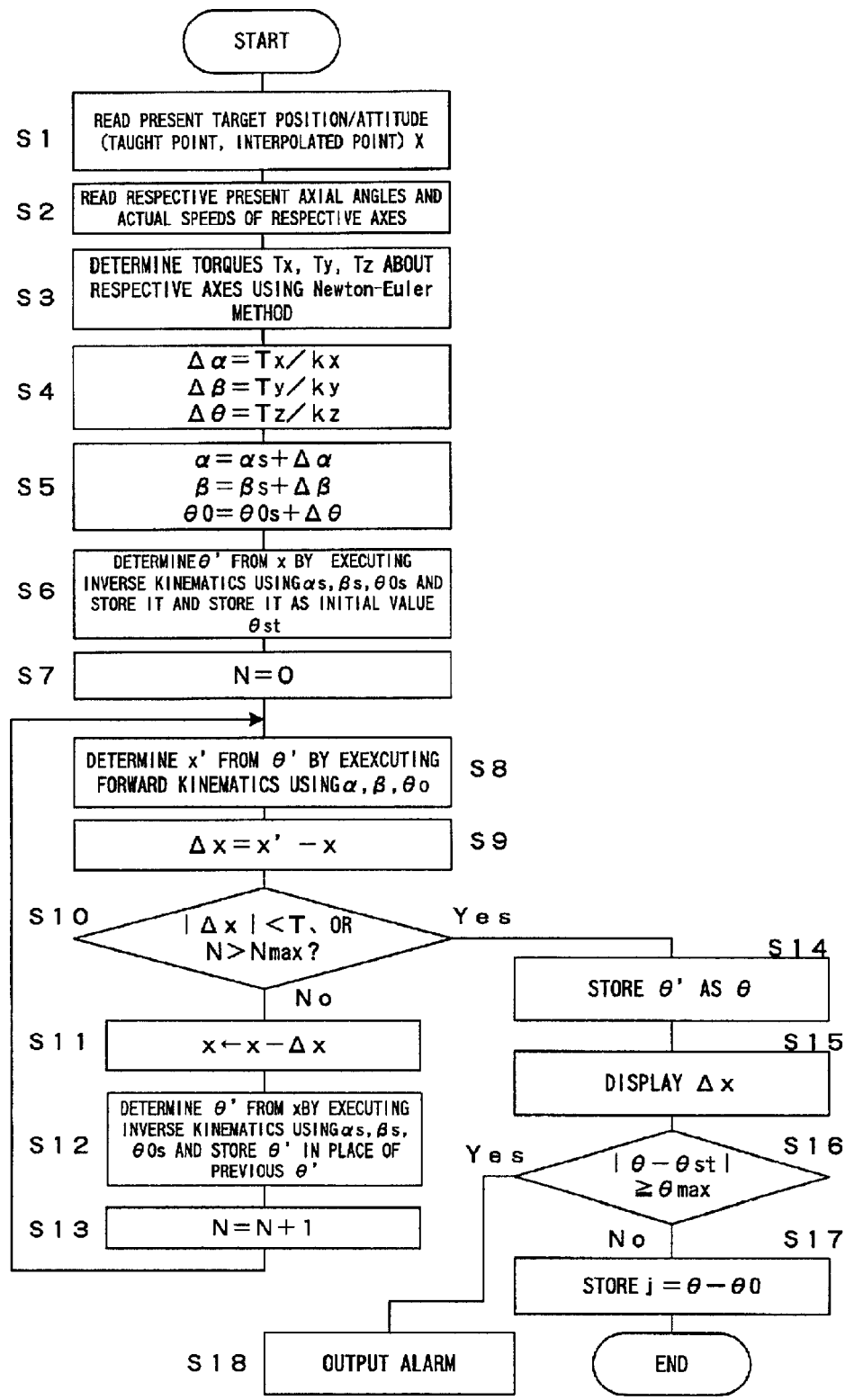
FIG. 5 is a flowchart of processing for correcting bending (twist) in the embodiment.

FIG. 5 is a flowchart of correction processing executed by the main processor 1 of the robot controller to determine the target position/attitude of the robot hand distal end (tool center point) of the robot in consideration of the bendings of the joints. This processing is executed in a predetermined cycle as long as or longer than a calculation cycle in the servo control. It should be noted that various set values are previously set. Corrected D-H parameters $\alpha s$, $\beta s$, and $\theta 0s$, when no twist is produced around the respective axes on the coordinate systems of the respective joints, are previously determined and set by calibration. Further, the spring constants kx, ky, and kz as the rigidity parameters about the respective axes on the coordinate systems of the respective joints are also measured and set previously.

The rigidity parameters, the moments about the axes of the respective joints, and the position/attitude of the robot hand distal end have the following relationship.

f(moment, rigidity)=robot hand distal end position or attitude

The following formula is obtained from the above formula.

rigidity=$f^{-1}$ (robot hand distal end position or attitude, moment)

Therefore, the robot is operated, the position/attitude of the robot hand distal end is measured, the moments about the respective axes are determined by a Newton-Euler method, or the like, and the rigidity parameters of kx, ky, and kz are determined and set.

First, a target position/attitude x commanded at this time, that is, a teaching point or an interpolating point x is read (step S1) by executing a teaching program. It is assumed in the embodiment that the position/attitude x is commanded in an orthogonal coordinate system based on a world coordinate system in the teaching program.

Next, the angles and actual rotational speeds of the respective joints at this time are read (step S2). The torques Tx, Ty, and Tz about the axes of the respective joints are determined using the Newton-Euler method based on the angles and actual rotational speeds of the respective joints which have been read (step S3). Further, the torques Tx, Ty, and Tz about the respective axes are divided by the spring constants kx, ky, and kz of the respective axes of the joints, which have been previously measured and set, respectively, so that the twists, that is, the bendings $\Delta\alpha$, $\Delta\beta$ and $\Delta\theta$ about the X-, Y-, and Z-axes of the respective joints are determined (step S4).

The corrected D-H parameters $\alpha s$, $\beta s$, and $\theta 0s$ where no twist is produced, each having been determined by calibration, are added to the twists (bendings) $\Delta\alpha$, $\Delta\beta$, and $\Delta\theta$, respectively, and a corrected D-H parameters $\alpha$, $\beta$, and $\theta 0$ in consideration of $\Delta\alpha$, $\Delta\beta$, and $\Delta\theta$ are determined (step S5). Then, a rotational angle $\theta'$ is determined from the target position/attitude x read at step S1 by executing inverse transformation using the corrected D-H parameters $\alpha s$, $\beta s$, and $\theta 0s$ where no twist is produced, and the rotational angle $\theta'$ is stored as a rotational angle $\theta st$ at the beginning of correction (step S6).

Next, a counter N is set to "0"(step S7), and a position/attitude x' is determined from the rotational angle $\theta'$ determined at step S6 by executing forward transformation using the corrected D-H parameters $\alpha$, $\beta$, and $\theta 0$ determined at step S5 (step S8). Then, the target position/attitude x read at step S1 is subtracted from the thus determined position/attitude x' to thereby calculate the difference $\Delta x$ therebetween (step S9).

It is determined whether or not the absolute value of the difference $\Delta x$ is smaller than a preset reference value T, or whether or not the value of the counter N exceeds a set value Nmax (step S10). When the absolute value of the difference $\Delta x$ exceeds the reference value T and the value of the counter N does not exceed the set value Nmax, the difference $\Delta x$ calculated at step S9 is subtracted from the present target position/attitude x and the result is set as a new target position/attitude x (step S11).

Next, a rotational angle $\theta'$ is determined from the new target position/attitude x read at step S11 by executing inverse kinematics using the corrected D-H parameters $\alpha s$, $\beta s$, and $\theta 0s$, where no twist is produced, again and substituted for the previous rotational angle (step S12). Then, the counter N is counted up by 1 (step S13), and the process returns to step S8.

Thereafter, the processing from step S8 to step S13 is repeatedly executed until it is determined that the absolute value of the difference $\Delta x$ becomes smaller than the reference value T or that the value of the counter N exceeds the set value Nmax. That is, a new target position/attitude is determined by executing forward kinematics and inverse kinematics alternately, and further the above processing is executed until the absolute value of the difference $\Delta x$ between the target position/attitude determined previously and the position/attitude newly determined by the forward kinematics becomes smaller than the reference value T. When the absolute value of the difference $\Delta x$ becomes smaller than the reference value T or the value of the counter N becomes the set value Nmax, the process goes from step S10 to step S14 and stores the rotational angle $\theta'$ determined at that time as a final rotational angle $\theta$ (step S14).

Further, the present difference $\Delta x$ is displayed (step S15). That is, the differences from the target positions x, y, and z of the robot hand distal end and the differences from the target attitudes w, p, and r thereof are displayed on the display unit of the teaching pendant 4 or on the display unit of a personal computer (not shown) connected to the robot controller (step S15).

Next, it is determined whether or not the absolute value of the difference between the final rotational angle θ and the rotational angle θst at the beginning of correction, determined at step S6, is equal to or larger than a set threshold value θmax (step S16). When the absolute value is equal to or larger than the threshold value θmax, alarm is issued and alarm processing is executed to abruptly stop the robot by applying brake thereto and outputting speed reduction torque commands to the servo motors of the respective axes (step S18). In contrast, when the absolute value is less than the set value θ max, a rotational angle j on the teaching pendant (rotational angle to be taught and commanded) is determined by subtracting the initial rotational angle θ0, determined at step S5, from the final rotational angle θ and stored (step S17).

Next, a second embodiment of the present invention, in which correction is performed taking the bending of an entire link into consideration, as shown in FIG. 3, will be described.

In the second embodiment, the following points are different from the processing shown by the processing flowchart shown in FIG. 5.

1. At step S4, the bending angle γ of the entire link as shown in FIG. 3 is calculated, in addition to Δα, Δβ, and Δθ. This bending angle γ is determined by dividing the torque Tz about the Z-axis determined at step S3 by the preset coefficient kz' for determining the bending of the link.

$$\gamma = Tz/kz'$$

2. Inverse kinematics and forward kinematics at steps S6, S12, and S8 are executed using the coordinate transformation matrix A shown in the formula (2).

3. In the inverse kinematics executed at steps S6 and S12, the value γ in the coordinate transformation matrix A shown in the formula (2) is set to "0". That is, as described above, γs=0 because no bending is produced.

The second embodiment is the same as the case in which only the bendings of the joints are taken into consideration as described above except the above points.

That is, a target position/attitude (teaching point, interpolating point) x commanded at the present time is read out and the axial angles and actual axis speeds of the respective axes are read, so that the torques Tx, Ty, and Tz about the axes of the respective joints are determined using the Newton-Euler method. Twists Δα, Δβ, and Δθ about the respective axes are determined by dividing the torques Tx, Ty, and Tz by the preset spring constants kx, ky, and kz and the bending angle γ of the link is determined by dividing the torque Tz by the set coefficient kz' (corresponding to steps S1 to S4).

$$\gamma = Tz/kz'$$

Next, corrected D-H parameters α, β, and θ0 in consideration of bendings (twists) are determined by adding Δα, Δβ, and Δθ to corrected D-H parameters αs, βs, and θ0s where no twist is produced. Further, γ is set to the value determined at previous step S4 with γ=Tz/kz' (corresponding to step S5).

Next, a rotational angle θ' is determined from the target position/attitude x by executing inverse kinematics by the coordinate transformation matrix A of the formula (2) with the corrected D-H parameters αs, βs, and θ0s, γ=0. The rotational angle θ' is stored as a rotational angle θst at the beginning of correction (corresponding to step S6).

Further, a position/attitude x' is determined from θ' by executing forward kinematics by the coordinate transformation matrix A of the formula (2) with the corrected D-H parameters α, β, and θ0 and the value of γ. A difference Δx (=x'−x) to the target position/attitude x is determined, a new target position/attitude is determined by subtracting the difference Δx from the target position/attitude x, and a rotational angle θ' is determined from the new target position/attitude x by executing inverse kinematics by the coordinate transformation matrix A of the formula (2) with the parameters αs, βs, θ0s and γ=0, (corresponding to steps S8 to S13) and substituted for the previous rotational angle. Subsequently, the forward kinematics and the inverse kinematics are alternately executed. When the difference Δx becomes smaller than the reference value T or the value resultant from the repeated execution of the forward and inverse kinematics exceeds the set value Nmax, the determined rotational angle θ' is stored as a final rotational angle θ, and the difference Δx between the target position/attitude and the determined position/attitude is displayed on the display unit. Then, it is determined whether or not the rotational angle θst at the beginning of rotational angle θ correction processing is equal to or larger than a threshold value θmax. When the rotational angle θst is equal to or larger than the threshold value θmax, alarm processing is executed, whereas when the rotational angle θst is less than the threshold value θmax, a rotational angle to be displayed on a teaching pendant, that is, a commanded rotational angle j is determined by subtracting the initial rotational angle θ0 from the determined rotational angle θ (corresponding to steps S14 to S18).

The above explanation is for the processing for determining the rotational angles j of the respective joints for positioning the robot to a target position/attitude by taking the bending (twists) of the joints into consideration or by taking the bending (twist) of the joints and also the bending of the links themselves into consideration, and correcting these bendings.

These processings may be executed in the calculation cycle longer than the calculation cycle for servo control. In this case, the above processings are executed for a teaching point or an interpolating point as a target commanded position/attitude obtained by executing a teaching program. First, two rotational angles j in which bendings (twists) are corrected are determined by executing the aforementioned processing twice, and data obtained by interpolating between the two rotational angles j is supplied to the servo controllers 5a1 to 5a6 of the respective joints to thereby drive and control the servo motors M1 to M6. Thereafter, internal interpolation is executed between a new rotational angle j obtained by the aforementioned processing executed in the present cycle and a rotational angle j obtained by the aforementioned processing executed in the cycle immediately before the present cycle, and data obtained thereby is supplied to the servo controllers 5a1 to 5a6 of the respective joints. That is, the robot actually starts operation with a delay of two cycles for correcting the bendings (twists).

In the above embodiment, the twists (bendings) about the X-, Y-, and Z-axes of the coordinate systems of the joints of the robot and further the bending of the links themselves are corrected. However, when elasticity exists at a portion other than the joints and twits (bendings) are produced at the portion, a dummy coordinate system (joint) is created at the portion, and the aforementioned processings shown in FIG. 5 are executed assuming that the number of axes of the robot is increased. In this case, a rotational angle j to be commanded is "0" because there is actually no servo motor as an actuator at the dummy portion. Further, when a tool mounted at the distal end of a robot arm has a less rigid portion, the axis of the less rigid portion is designated and inputted by the teaching pendant 4. For example, this axis is expressed by a linear formula and inputted. Further, the weight, shape, and the like of the tool are also inputted. Then, the less rigid portion is assumed as a dummy joint based on the linear formula of the axis, and a command for also correcting the bending of the less rigid portion is outputted by the aforementioned method.

In the above embodiment, the torques Tx, Ty, and Tz about the respective axes on the coordinate systems of the joints are determined by the calculation using the Newton-Euler method. However, the torques Tx, Ty, and Tz about the respective axes may be detected using a force sensor or a torque sensor. In this case, the processings at steps S2 and S3 shown in FIG. 5 are executed using the forces or torques obtained by these sensors.

The present invention can be applied to a burr removing robot in which a robot hand distal end is pressed against an object, wherein the bending produced when the distal end is pressed against the object is corrected. In this case, a reaction force resulting the pressing operation is detected by the sensors as described above, and the aforementioned correction processings are executed based on the reaction force, thereby the offset of the distal end position of the robot hand made by bending due to external force is also compensated.

Further, the above embodiments show an example in which a teaching program is programmed at a position on the orthogonal coordinate system. However, in the case of a teaching program taught with the rotational angles of the respective articulate axes, the commanded rotational angles j of the respective articulate axes are read at step S1 and transformed to rotational angles θ. These rotational angles θ are considered to be rotational angles θ' and θst in step S6, and the position/attitude x on the orthogonal coordinate system is determined by executing forward kinematics with the rotational angle θ'. Other processings are similar to those shown in FIG. 5.

As described above, according to the present invention, the articulated flexible robot can be operated at high speed with high accuracy by correcting the bendings produced in the robot. The robot can be operated with further high accuracy by executing correction taking the influence of an attitude that is changed not only by the twists of the joints but also by the bendings of the entire links.

Even when an amount of correction abnormally increases, it is made unnecessary to abruptly operate the robot because alarm is issued.

When a calculation cycle for servo control is not sufficient for correction calculation time, a correction calculation can be executed in a cycle longer than the calculation cycle for servo control, and thus it is not necessary to decrease the performance of the servo control itself.

Further, it is possible to find the accuracy and rigidity of the robot by displaying the offset of the robot hand distal end from a target position and/or the offset of the robot hand distal end from a target attitude.

It is possible to correct not only the bending of a robot main body but also the bending produced in a tool mounted to the robot hand distal end, where necessary.

A troublesome adjustment job is not necessary because the rigidity parameters can be simply calculated from obtained data.

The robot can be operated with high accuracy also in an application for executing a job by pressing the robot hand distal end.

What is claimed is:

1. A robot controller for driving respective links of a robot by respective actuators, comprising:
   a bending calculation unit determining the bending produced in respective joints at a target position/attitude of a robot hand distal end based on a teaching program, or determining the bendings produced in said respective joints and the respective links;
   an offset calculation unit determining an offset from the target position and/or an offset from the target attitude of a distal end of the robot based on the determined bendings; and
   a position correction unit determining positions of the actuators for driving the robot hand distal end to a position and/or an attitude to which a correction having the same magnitudes as those of said offset is applied in an inverse direction.

2. A robot controller according to claim 1, wherein:
   the bending calculation unit comprises a bending calculation means for determining the bending produced in the respective joints, or determining the bendings produced in said respective joints and the respective links;
   the robot hand distal end offset calculation unit comprises a robot hand distal end offset calculation means for determining the offset; and
   the corrected position calculation unit comprises a corrected position calculation means for determining the positions of the actuators.

3. The robot controller according to claim 2, wherein the bending calculation means determines the bending of the respective joints and the bendings of the links separately.

4. The robot controller according to claim 2, wherein said corrected position calculation means determines the positions of the actuators by a converging calculation in which forward kinematics in consideration of the bendings and inverse kinematics ignoring the bending are alternately repeated.

5. The robot controller according to claim 2, further comprising means for determining the difference between the positions of the actuators before and after the execution of correction of the bendings, wherein when said difference exceeds a threshold value, alarm processing is executed.

6. The robot controller according to claim 2, wherein the corrected position calculation means determines the corrected positions of the actuators in a cycle longer than a calculation cycle for servo control.

7. The robot controller according to claim 6, wherein the corrected positions of the actuators determined in the above cycle are internally interpolated and supplied to the actuators of the respective joints as commanded positions.

8. The robot controller according to claim 2, comprising means for displaying the offset from the target position of the robot hand distal end determined above and/or the offset from the target attitude of the robot hand distal end determined above.

9. The robot controller according to claim 2, further comprising:
   means for designating an axis where bending is produced in a tool mounted to the robot hand distal end; and
   means for correcting the offset of position and/or the offset of the attitude of the robot hand distal end produced by the bending.

10. The robot controller according to claim 2, wherein the optimum values of the rigidity parameters used by the bending calculation means are determined based on the position and/or the attitude of the robot hand distal end assumed when the robot is operated and the moment acting at that time.

11. A robot controller for a robot whose respective links are driven by respective actuators and which executes a job by pressing a robot hand distal end against an object, comprising:

a sensor for detecting a reaction force produced when pressing the robot hand distal end against the object;

bending calculation means for determining the bendings produced in the respective joints at the target position/attitude of the robot hand distal end based on a teaching program;

robot hand distal end offset calculation means for determining the offset from the target position and/or the offset from the target attitude of the distal end based on the thus determined bendings; and corrected position calculation means for determining the positions of the actuators for driving the robot hand distal end to a position and/or an attitude to which a correction having the same magnitudes as those of said offset is applied in an inverse direction.

12. A method for driving respective links of a robot by respective actuators, comprising:

determining a bending produced in respective joints at a target position/attitude of a robot hand distal end based on a teaching program, or determining bendings produced in said respective joints and the respective links;

determining an offset from the target position and/or the offset from the target attitude of a distal end of the robot based on the determined bendings; and determining positions of the actuators for driving the robot hand distal end to a position and/or an attitude to which a correction having the same magnitudes as those of said offset is applied in an inverse direction.

13. A method according to claim 12, wherein the determining of the bendings comprises determining bendings of the respective joints and bendings of the links separately.

14. A method according to claim 12, wherein the positions of the actuators are determined by a converging calculation in which forward kinematics in consideration of the bendings and inverse kinematics ignoring the bending are alternately repeated.

15. A method according to claim 12, further comprising determining the difference between the positions of the actuators before and after the execution of correction of the bendings, wherein when said difference exceeds a threshold value, alarm processing is executed.

16. A method according to claim 12, further comprising determining the corrected positions of the actuators in a cycle longer than a calculation cycle for servo control.

17. A method according to claim 16, wherein the corrected positions of the actuators determined in the above cycle are internally interpolated and supplied to the actuators of the respective joints as commanded positions.

18. A method according to claim 12, further comprising displaying the offset from the target position of the robot hand distal end determined above and/or the offset from the target attitude of the robot hand distal end determined above.

19. A method according to claim 12, further comprising:

designating an axis where bending is produced in a tool mounted to the robot hand distal end; and correcting the offset of position and/or the offset of the attitude of the robot hand distal end produced by the bending.

20. A method according to claim 12, wherein the optimum values of the rigidity parameters, used by the bending determining, are determined based on the position and/or the attitude of the robot hand distal end assumed when the robot is operated and the moment acting at that time.

* * * * *